Dec. 12, 1961 W. D. LUDWIG 3,012,578
DOUBLE PLUNGER SOLENOID VALVE
Filed March 16, 1959 3 Sheets-Sheet 1
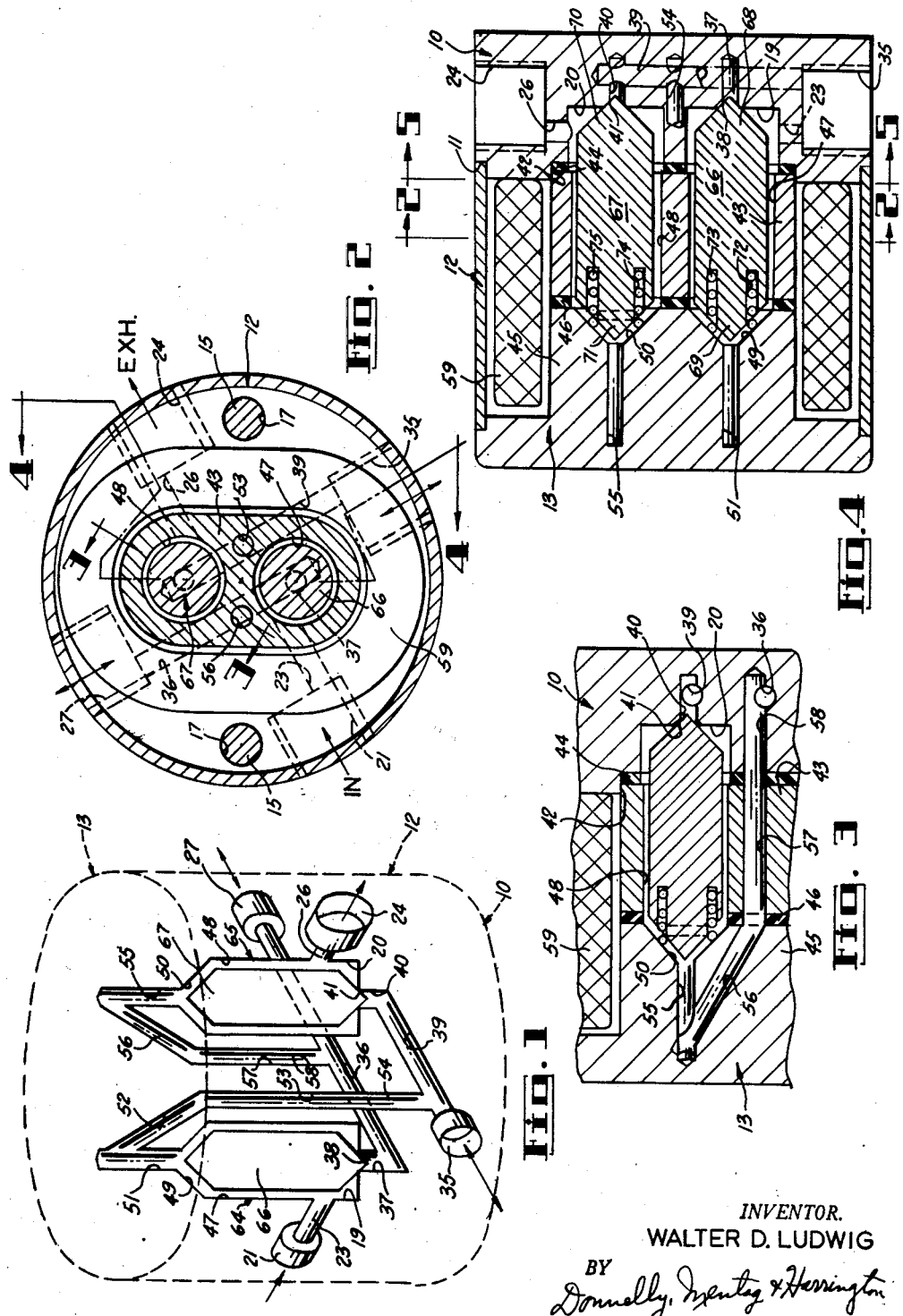
INVENTOR.
WALTER D. LUDWIG
BY
Donnelly, Mentag & Harrington
ATTORNEYS

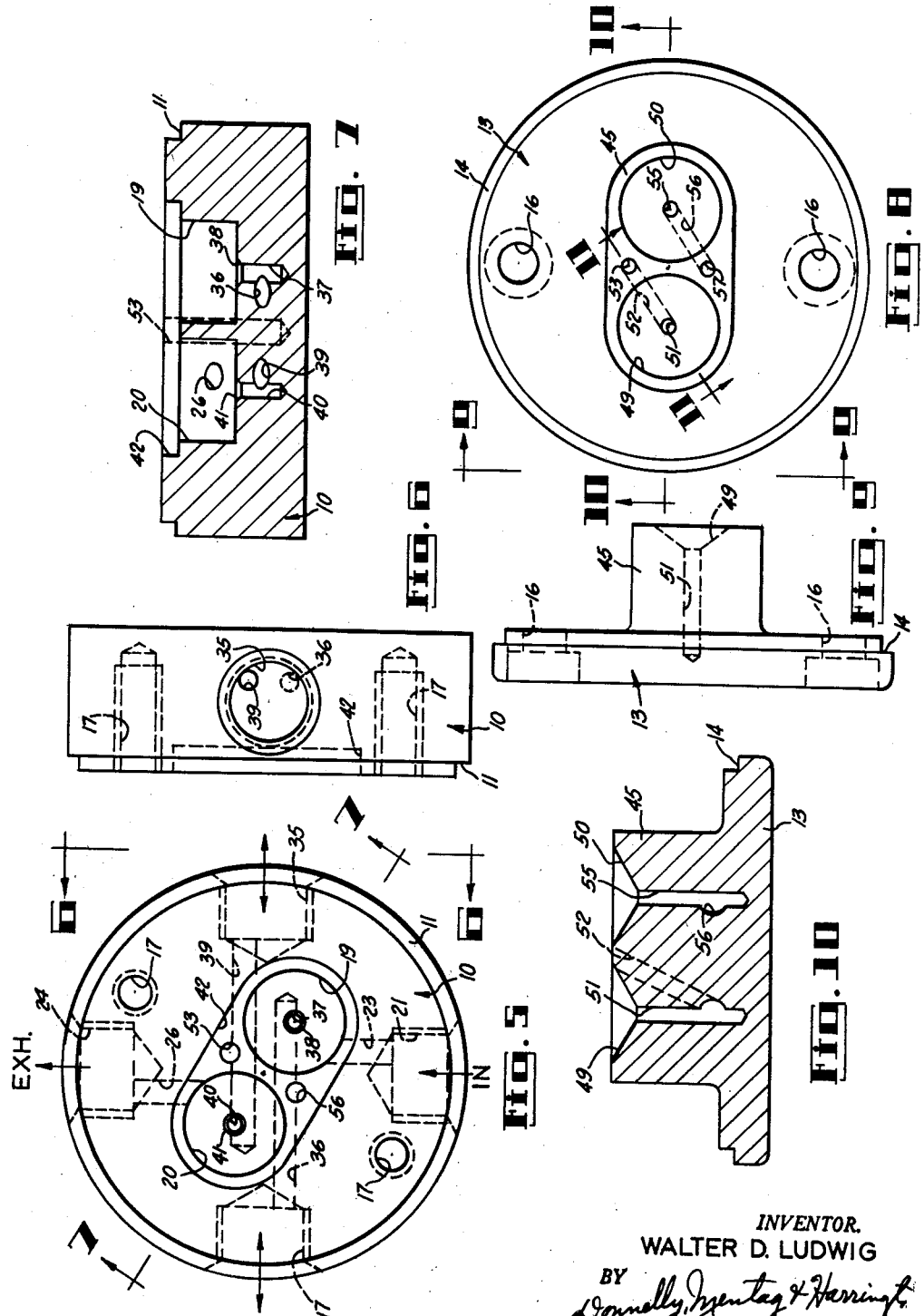

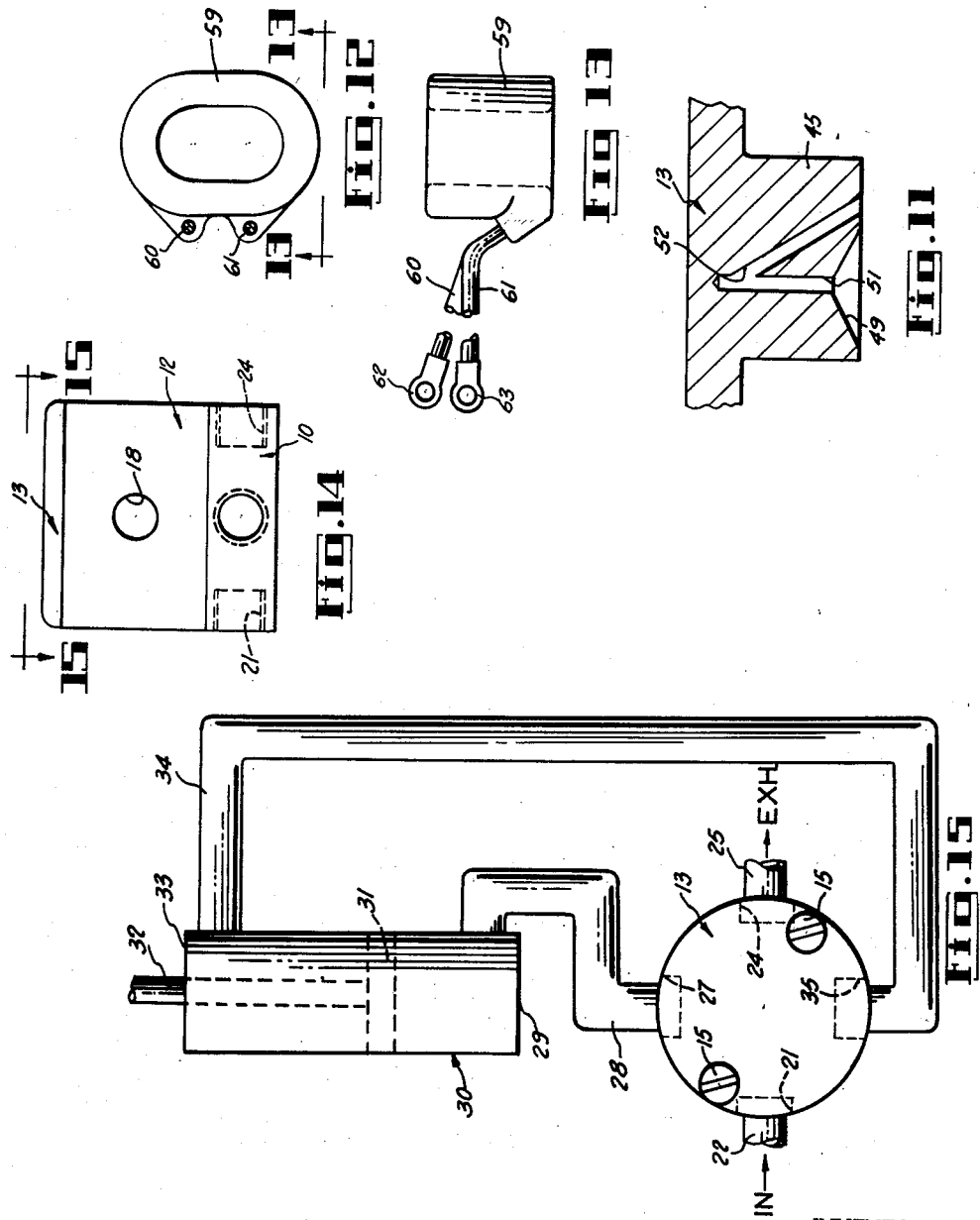

United States Patent Office 3,012,578
Patented Dec. 12, 1961

3,012,578
DOUBLE PLUNGER SOLENOID VALVE
Walter D. Ludwig, 10030 Capital, Detroit, Mich.
Filed Mar. 16, 1959, Ser. No. 799,521
6 Claims. (Cl. 137—623)

My invention relates to a new and useful improvement in a solenoid operated valve in which a pair of plungers or armatures are operated simultaneously. This type of valve is intended to control the flow of fluid under pressure and particularly, the flow of compressed air.

It is an object of the present invention to provide a double plunger solenoid operated valve which will be simple in structure, economical of manufacture, durable and highly efficient in use.

It is another object of the present invention to provide a solenoid operated valve wherein two armatures or plungers are operated by a common solenoid coil.

It is a further object of the present invention to provide a solenoid operated valve whereby two valve members operate simultaneously thus making it possible to obtain a four-way valve action.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a diagrammatic view of an illustrative embodiment of the invention;

FIG. 2 is a central cross sectional view of the valve structure illustrated in FIG. 4, taken along the line 2—2 thereof, and looking in the direction of the arrows;

FIG. 3 is a fragmentary elevational sectional view, showing one of the movable armatures in a side elevation, taken substantially along the line 3—3 of the valve illustrated in FIG. 2, and looking in the direction of the arrows;

FIG. 4 is an elevational sectional view of the valve structure illustrated in FIG. 2, taken along the line 4—4 thereof, and looking in the direction of the arrows;

FIG. 5 is a top view of the valve base, taken along the line 5—5 of FIG. 4, and looking in the direction of the arrows;

FIG. 6 is a side elevational view of the structure illustrated in FIG. 5, taken along the line 6—6 thereof, and looking in the direction of the arrows;

FIG. 7 is an elevational sectional view of the structure illustrated in FIG. 5, taken along the line 7—7 thereof, and looking in the direction of the arrows;

FIG. 8 is a bottom plan view of the top end cap of the valve;

FIG. 9 is a side elevational view of the structure illustrated in FIG. 8, taken along the line 9—9 thereof, and looking in the direction of the arrows;

FIG. 10 is an elevational sectional view of the structure illustrated in FIG. 8, taken along the line 10—10 thereof, and looking in the direction of the arrows;

FIG. 11 is an elevational sectional view of the structure illustrated in FIG. 8, taken along the line 11—11 thereof, and looking in the direction of the arrows;

FIG. 12 is a top plan view of a solenoid coil used in the valve of the present invention;

FIG. 13 is an end elevational view of the structure illustrated in FIG. 12, taken along the line 13—13 thereof, and looking in the direction of the arrows;

FIG. 14 is a reduced side elevational view of a valve made in accordance with the principles of the invention; and, FIG. 15 is a top view of the valve illustrated in FIG. 14 and showing the valve connected to a cylinder to be controlled by the valve.

Referring now to the drawings, and especially to FIGS. 2, 4 and 14, an illustrative embodiment of the invention is shown as including an annular base member 10 made preferably from magnetic iron and which is provided on the upper side thereof with the peripheral step or shoulder 11. A tubular spacer 12 is disposed on the base 10, with its lower end being seated on the shoulder 11. The tubular spacer 12 is preferably made from magnetic iron and this spacer functions as a side cover wall for the valve structure. As shown in FIGS. 4, 8 and 9, the valve structure is enclosed on the upper end thereof by the annular top end cap 13 which is provided with the peripheral step or shoulder 14 on the lower side thereof. The upper end of the spacer 12 is adapted to be seated on the shoulder 14.

As shown in FIGS. 2, 5, 8, 9 and 15, the base 10, the spacer 12 and the top end cap 13 are detachably secured together by means of the two bolts 15 which pass through the holes 16 in the top end cap 13 and are threadably engaged in the holes 17 in the base 10. As shown in FIG. 14, the spacer 12 is provided with a hole therethrough as indicated by the numeral 18 for the passage of electrical conductors, as more fully described hereinafter.

It will be seen that the base 10, and the top cap 13 form end walls which coact with the tubular spacer 12 to form an overall encased housing for the valve. As best seen in FIGS. 4, 5, 6, 7 and 15, the base 10 is provided with a pair of spaced apart longitudinally extended vertical bores 19 and 20 which extend into the base from the upper side thereof. An inlet port 21 is formed in the base 10 and is adapted to have threadably mounted therein the end of a conduit as 22 which would be connected to a suitable source of air under pressure. The inlet port 21 is connected to the bore 19 by means of the horizontal bored passage 23. An exhaust port 24 is formed in the base 10 and is adapted to have threadably mounted therein the end of a conduit as 25 which exhausts the valve to the atmosphere. The exhaust port 24 is connected to the bore 20 by means of the horizontal bored passage 26.

As best seen in FIGS. 4, 5, 6, 7 and 15, a first air delivery port 27 is formed in the base 10 and threadably mounted therein is one end of the delivery conduit 28. The other end of the conduit 28 is connected to the head end 29 of the air cylinder 30 which may be controlled by the valve. The air cylinder or fluid motor 30 is merely illustrative of the type of mechanisms which can be controlled by the valve of the present invention. It is believed obvious that the valve of the present invention may be used on other types of pneumatic equipment wherein it is desired to obtain a simple and compact four-way control valve. The illustrative air cylinder is provided with the usual piston 31 and rod 32. The rod end of the cylinder 30 is connected by means of the delivery conduit 34 to the second air delivery port 35 formed in the base 10.

As best seen in FIGS. 4, 5, 6 and 7, the first air delivery port 27 is connected to the bore 19 by means of the bored horizontal passage 36 and the bored vertical passage 37. The passage 37 is formed centrally or axially relative to the bore 19. The upper end of the vertical bore 37 is chamfered to form a valve seat as indicated by the numeral 38. The second air delivery port 35 is connected to the bore 20 by means of the bored horizontal passage 39 and the bored vertical passage 40. The passage 40 is formed centrally or axially relative to the bore 20. The upper end of the vertical bore 40 is chambered to form a valve seat as indicated by the numeral 41.

As best seen in FIGS. 4, 5, 6 and 7, the upper end of the base 10 is provided with an elongated recess 42 formed therein and which surrounds the bores 19 and 20. Releasably mounted or seated in the recess 42 is the core guide 43. The lower end of the core guide 43 is seated in the recess 42 and this core guide or liner is preferably formed from brass or a like non-magnetic material. A gasket 44, made from any suitable material, is interposed between the lower end of the core guide 43 and the lower end of the recess 42. As best seen in FIGS. 4, 8 and 9, the upper end of the core guide 43 is seated against the lower or inner end of the centrally disposed, downwardly extended projection 45 which is integral with the top end cap 13 and which is formed similar in cross section to the core guide 43. A gasket 46, made from any suitable material, is interposed between the lower end of the projection 45 and the upper end of the core guide 43.

As best seen in FIGS. 3, 4, 8, 9 and 10, the core guide 43 is formed with a pair of spaced apart bores therethrough, as 47 and 48, which communicate at the lower end thereof with the bores 19 and 20, respectively, in the base 10. The upper ends of the core guide bores 47 and 48 communicate with the valve seats 49 and 50, respectively, which are formed in the lower face of the projection 45 on the top end cap 13. The valve seat 49 is connected to the centrally disposed bored passage 51 in the top end cap 13 which in turn is connected to the sloping bored passage 52 in the top end cap 13. The sloping passage 52 is connected to the vertical bored aligned passages 53 and 54 in the core guide 43 and base 10, respectively. The passage 54 communicates with the passage 39 and air delivery port 35. The valve seat 50 is connected to the centrally disposed bored passage 55 in the top end cap 13 which in turn is connected to the sloping bored passage 56 in the top end cap 13. The sloping passage 56 is connected to the vertical bored aligned passages 57 and 58 in the core guide 43 and base 10, respectively. The passage 58 communicates with the passage 36 and air delivery port 27.

As shown in FIGS. 2, 4, 12 and 13, a solenoid coil 59 is operatively mounted in the casing formed by the base 10, the top end cap 13 and the spacer 12. The solenoid coil 59 functions as an electro magnet and is disposed around the core guide 43 and is provided with the electrical conductors or lead wires 60 and 61 which are provided with the usual terminal contacts 62 and 63 adapted to be connected to a suitable source of A.C. or D.C. current. The lead wires 60 and 61 would extend outwardly through the hole 18 formed in the side of the spacer 12.

It will be seen that the bores 19 and 20 in the base 10 coact with the bores 47 and 48 in the core guide 43, and the valve seats 49 and 50 in the top end cap 13, respectively, to form a pair of valve chambers. As shown in the diagrammatic view of FIG. 1, these valve chambers are generally indicated by the numerals 64 and 65. It will be seen that the top end of the chamber 64 is connected to the second air delivery port 35, and that the bottom end thereof is connected to the first air delivery port 27. It will also be seen that the top end of the chamber 65 is connected to the first air delivery port 27, and that the bottom end thereof is connected to the second air delivery port 35.

Slidably mounted in the valve chambers 64 and 65 are the solenoid plungers or armatures 66 and 67, respectively, which are preferably made from cold rolled steel, or like material, and chrome plated. As shown in the drawings, the plunger 66 and 67 are freely movable longitudinally in their respective chambers to permit air to pass therearound. The plunger 66 is provided on the lower end thereof with the conical terminal valve portion 68 and on the upper end thereof with the conical terminal valve portion 69. The plunger 67 is provided on the lower end thereof with the conical terminal valve portion 70 and on the upper end thereof with the conical terminal valve portion 71. As best seen in FIG. 4, the plungers 66 and 67 are provided on the upper ends thereof with an annular recess as 72 and 74, in which are seated the springs 73 and 75, respectively. It will be seen, that the springs 73 and 75 normally bias the plungers 66 and 67 downwardly when the solenoid coil 59 is de-energized so that the conical valve terminal portions 68 and 70 are seated on the valve seats 38 and 41, respectively, to seal off the passages 37 and 40, respectively. When the solenoid coil 59 is energized, the plungers 66 and 67 will be magnetically pulled upwardly to the left as viewed in FIG. 4, against the pressure of springs 73 and 75, respectively, whereby the conical valve terminal portions 69 and 71 will seat in the valve seats 49 and 50 to close off the passages 51 and 55, respectively.

It is, of course, obvious that the solenoid coil lead wires 60 and 61 will be connected to a source of electrical power in a conventional manner. The control mechanism or switch mechanism which would control the delivery of electrical energy through the lead wires 60 and 61 is not disclosed as such switch mechanism would form no part of the present invention, but may be any suitable switching mechanism.

The valve of the present invention may be used to control many different devices. However, for purposes of illustration a fluid motor or air cylinder 30 has been shown in FIG. 15 as being controlled by the valve of the present invention. When the solenoid coil 59 is de-energized, the plungers 66 and 67 will be in the positions shown in FIGS. 1 and 4. Air under pressure will enter through the inlet port 21 and pass through the passage 23, the chamber 64, the passages 51, 52, 53, 54 and 39 and out through the delivery port 35 and through the conduit 34 to the rod end 33 of the cylinder 30. Simultaneously the air from the head end 29 of the cylinder 30 will be exhausted through the conduit 28 and into the first air delivery port 27. The air being exhausted then passes through the passages 36, 58, 57, 56, and 55 and the chamber 48, and the passage 26 and thence out through the exhaust port 24 to the atmosphere.

When the solenoid is energized, the plungers 66 and 67 will be moved to the left as viewed in FIG. 4 or upwardly as viewed in FIG. 1. Air under pressure will then enter through the inlet port 21 and pass through the passage 23, and chamber 64, the passages 37 and 36 and out through the first air delivery port 27 and through the conduit 28 and into the head end 29 of the cylinder 30. Simultaneously air will be exhausted from the rod end 33 of the cylinder 30 through the conduit 34 and into the second air delivery port 35. The air will then pass through the passages 39 and 40, the chamber 48, the passage 26 and thence out through the exhaust port 24 to the atmosphere.

With this type of structure it is possible to magnetically control the simultaneous operation of a pair of cores or plungers, each controlling the delivery of fluid under pressure to the rod end or head end of an air cylinder, alternately, and control communication, alternately, to the rod end or head end of the cylinder with the atmosphere. Experience has shown that a very compact, durable, silent working and highly efficient four-way valve control is thus afforded by the valve of the present invention.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A double armature solenoid flow control valve comprising: a housing; a solenoid mounted in said housing and embodying a winding and a pair of movable plungers; a pair of end walls, one positioned at each end of said housing, and each provided on its inner face with a pair of valve seats communicating with a pair of air passages, said valve seats being in alignment with said plungers, each of said plungers being movable into engagement at their ends with one of said aligned valve seats; a pair of springs positioned within said housing, each engaging at one of its ends with an end wall of said housing and at its opposite end with one of said plungers, for moving said plungers, upon de-energizing of said solenoid, for effecting engagement of the opposite ends of said plungers with a pair of said aligned valve seats; said end walls having a plurality of passages formed therein; an inlet passage for admitting air under pressure into the valve; a pair of delivery conduits communicable with said inlet passage for conducting air through said housing to alternate opposite ends of an air operated mechanism to be controlled by the valve, the end of the mechanism to which the air under pressure is delivered being controlled by said plungers and, upon communication with the air under pressure at one end of said air operated mechanism, the opposite end being connected to an exhaust conduit.

2. A double plunger solenoid valve adapted for use with an air cylinder which has a rod end and a head end and for controlling delivery of air under pressure alternately, simultaneously to the head end and to the rod end of said cylinder comprising: a housing having a pair of end walls, said end walls having a plurality of passages formed therein; a conduit for delivery of air under pressure into said passages; a solenoid mounted in said housing comprising a winding and a pair of spaced apart plungers; the inner faces of each of said end walls having a pair of valve seats formed thereon which are each connected to one of said passages; said valve seats being in alignment with opposite ends of said plungers; said plungers being movable into engagement with the valve seats at one end wall upon energizing of said solenoid; a pair of springs mounted in said housing, which each engage at one of the ends thereof with an end wall and at the opposite ends thereof with a plunger for moving, upon de-energizing of said solenoid, the plungers to the valve seats in the opposite end wall for controlling flow of air through a passage; a conduit communicating said passages with the head end of said cylinder; a conduit communicating the rod end of said cylinder with said passages; said valve plungers upon movement in one direction closing communication of the head end of said cylinder with the air delivery conduit and opening said ends to an exhaust conduit and upon movement in the opposite direction closing the rod end of said cylinder against communication with the air delivery conduit and opening said rod end into communication with the exhaust conduit.

3. In a solenoid valve of the character described, the combination of, a casing; a pair of valve chambers in said casing; each of said chambers having a valve seat formed at each end thereof; a plunger having a valve member on each end movably mounted in each of said chambers; resilient means for normally urging each of said plungers to one end of each chamber to seat the adjacent valve member on the plungers against the valve seats in said one end of each chamber; a solenoid coil in said casing and disposed to surround the plungers and operable to urge the plungers to the other ends of said chambers to seat the adjacent valve members on the plungers against the valve seats in the other ends of the chambers; an air inlet port in said casing connected to a first one of said pair of chambers; an exhaust port connected to the second one of said pair of chambers; a first air delivery port connected to the valve seat in said one end of the first chamber and to the valve seat in said other end of the second chamber; and, a second air delivery port connected to the valve seat in said one end of the second chamber and to the valve seat in said other end of the first chamber.

4. In a solenoid valve of the character described, the combination of, a casing comprising a base, a top end cap, a core guide interconnecting the base and top end cap, and a tubular spacer surrounding the core guide and spaced therefrom and interconnecting the base and top end cap; a pair of valve chambers formed in said casing and extending from said base and through said core guide and into said top end cap; an air inlet port, an exhaust port, a first air delivery port, and a second air delivery port in said base; a first passage means connecting the inlet port to a first one of said pair of chambers; a second passage means connecting the exhaust port to the second one of said pair of chambers; a third passage means connecting the first air delivery port to the base end of the first chamber and to the top cap end of the second chamber; a fourth passage means connecting the second air delivery port to the top cap end of the first chamber and to the base end of the second chamber; a movable valve member in each of said chambers; resilient means for normally urging the valve members to the base ends of the chambers for closing off the passage means connected to the base ends of the chambers; and, a solenoid coil in said casing surrounding the core guide and energizable to cause the valve members to move to the top cap ends of the chambers against the action of said resilient means to close off the passage means connected to the top cap ends of the chambers.

5. In a solenoid valve of the character described, the combination of, an annular base having a peripheral shoulder on the upper side thereof; a tubular spacer having the lower end seated on said base shoulder; an annular top end cap having a peripheral shoulder on the lower side thereof mounted on said spacer with the top end cap shoulder being seated on the upper end of the spacer; said base being provided with a centrally disposed recess on the upper side thereof; said top end cap being provided with a centrally disposed, downwardly extended projection; a core guide in said spacer having the lower end thereof seated in said base recess and the upper end thereof seated on said top end cap projection; fastening means detachably connecting said base, top end cap, spacer and core guide together; a pair of valve chambers formed in said top end cap, core guide and base and extending vertically from said base upwardly through said core guide and into said top end cap; an air inlet port, an exhaust port, a first air delivery port, and a second air delivery port in said base; a first passage means connecting the inlet port to a first one of said pair of chambers; a second passage means connecting the exhaust port to the second one of said pair of chambers; a third passage means connecting the first air delivery port to the base end of the first chamber and to the top cap end of the second chamber; a fourth passage means connecting the second air delivery port to the top cap end of the first chamber and to the base end of the second chamber; a movable combined solenoid plunger and valve member in each of said chambers; resilient means for normally urging the valve members to the base ends of the chambers for closing off the passage means connected to the base ends of the chambers; and, a solenoid coil in said spacer surrounding the core guide and energizable to cause the valve members to move to the top cap ends of the chambers against the action of said resilient means to close off the passage means connected to the top cap ends of the chambers.

6. In a solenoid valve of the character described, the combination of, an annular base having a peripheral shoulder on the upper side thereof; a tubular spacer having the lower end seated on said base shoulder; an annular top end cap having a peripheral shoulder on the lower side thereof mounted on said spacer with the top end cap shoulder being seated on the upper end of the spacer; said base being provided with a centrally disposed recess on the upper side thereof; said top end cap being provided with a centrally disposed, downwardly extended projection; a core guide in said spacer having the lower end thereof seated in said base recess and the upper end thereof seated on said top end cap projection; fastening means detachably connecting said base, top end cap, spacer and core guide together; a pair of valve chambers formed in said top end cap, core guide and base and extending vertically from said base upwardly through said core guide and into said top end cap; an air inlet port, an exhaust port, a first air delivery port, and a second air delivery port in said base; a first passage formed through said base and connecting the inlet port to a first one of said pair of chambers; a second passage formed through said base and connecting the exhaust port to the second one of said pair of chambers; a third passage means formed through said base, core guide and top end cap and connecting the first air delivery port to the base end of the first chamber and to the top cap end of the second chamber; a fourth passage means formed through said base, core guide and top end cap and connecting the second air delivery port to the top cap end of the first chamber and to the base end of the second chamber; a movable elongated combined solenoid plunger and valve member in each of said chambers; resilient means for normally urging the valve members to the base ends of the chambers for closing off the third and fourth passage means at the base ends of the chambers; and, a solenoid coil in said spacer surrounding the core guide and energizable to cause the valve members to move to the top cap ends of the chambers against the action of said resilient means to close off the third and fourth passage means at the top cap ends of the chambers.

References Cited in the file of this patent

UNITED STATES PATENTS

| | | |
|---|---|---|
| 2,390,425 | Crum | Dec. 4, 1945 |
| 2,759,459 | Lucien | Aug. 21, 1956 |
| 2,821,997 | Clay et al. | Feb. 4, 1958 |
| 2,891,577 | Stewart | June 23, 1959 |

FOREIGN PATENTS

| | | |
|---|---|---|
| 575,440 | Great Britain | Feb. 18, 1946 |
| 493,921 | Belgium | Feb. 28, 1950 |